(12) United States Patent
Ribble et al.

(10) Patent No.: US 9,794,552 B1
(45) Date of Patent: Oct. 17, 2017

(54) CALIBRATION OF ADVANCED DRIVER ASSISTANCE SYSTEM

(71) Applicant: Lytx, Inc., San Diego, CA (US)

(72) Inventors: Dennis Ribble, McFarland, WI (US); Gregory Dean Sutton, Del Mar, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/530,503

(22) Filed: Oct. 31, 2014

(51) Int. Cl.
*H04N 17/00* (2006.01)

(52) U.S. Cl.
CPC .................................. *H04N 17/002* (2013.01)

(58) Field of Classification Search
CPC .................................................... H04N 17/002
See application file for complete search history.

(56) References Cited

U.S. PATENT DOCUMENTS

| | | | | |
|---|---|---|---|---|
| 2004/0061596 A1* | 4/2004 | Egami | ................ | B62D 15/0265 340/425.5 |
| 2006/0113434 A1* | 6/2006 | Richter | ............... | B60R 11/0235 248/121 |
| 2009/0033926 A1* | 2/2009 | Haug | .................... | G06T 7/0018 356/243.1 |
| 2010/0172542 A1* | 7/2010 | Stein | .................. | G06K 9/00798 382/103 |
| 2010/0201814 A1* | 8/2010 | Zhang | .................. | G06K 9/4647 348/148 |
| 2010/0254697 A1* | 10/2010 | Johnson | ................. | F16M 11/02 396/428 |
| 2011/0169998 A1* | 7/2011 | Canetti | .............. | H04N 5/23212 348/348 |
| 2012/0233841 A1* | 9/2012 | Stein | ...................... | G03B 17/02 29/428 |
| 2013/0141520 A1* | 6/2013 | Zhang | .................. | G06K 9/4638 348/36 |

\* cited by examiner

*Primary Examiner* — Michael Teitelbaum
(74) *Attorney, Agent, or Firm* — Van Pelt, Yi & James LLP

(57) ABSTRACT

A system for calibrating includes an input interface and a calibration parameter determiner. The input interface is configured to receive an image data of a calibrator in front of a camera unit. The camera unit is mounted inside a vehicle. The calibrator is mounted outside the vehicle. The calibration parameter determiner is configured to determine a calibration parameter based at least in part on the image data. The calibration parameter enables determination of an object proximity and a lane pattern.

20 Claims, 10 Drawing Sheets

CALIBRATION OF ADVANCED DRIVER ASSISTANCE SYSTEM

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. The vehicle event recorder system can additionally be used as part of a driver assistance system (e.g., advanced driver assistance systems (ADAS)). The driver assistance system monitors driver behavior and assists the driver with the driving process—for example, with lane position, changing lanes, following distance, maintaining speed, etc. In order for the driver assistance system to function properly, the driver assistance sensors must be calibrated (e.g., so that lane position or following distance can be accurately measured).

BRIEF DESCRIPTION OF THE DRAWINGS

Various embodiments of the invention are disclosed in the following detailed description and the accompanying drawings.

DETAILED DESCRIPTION

Figure 1:
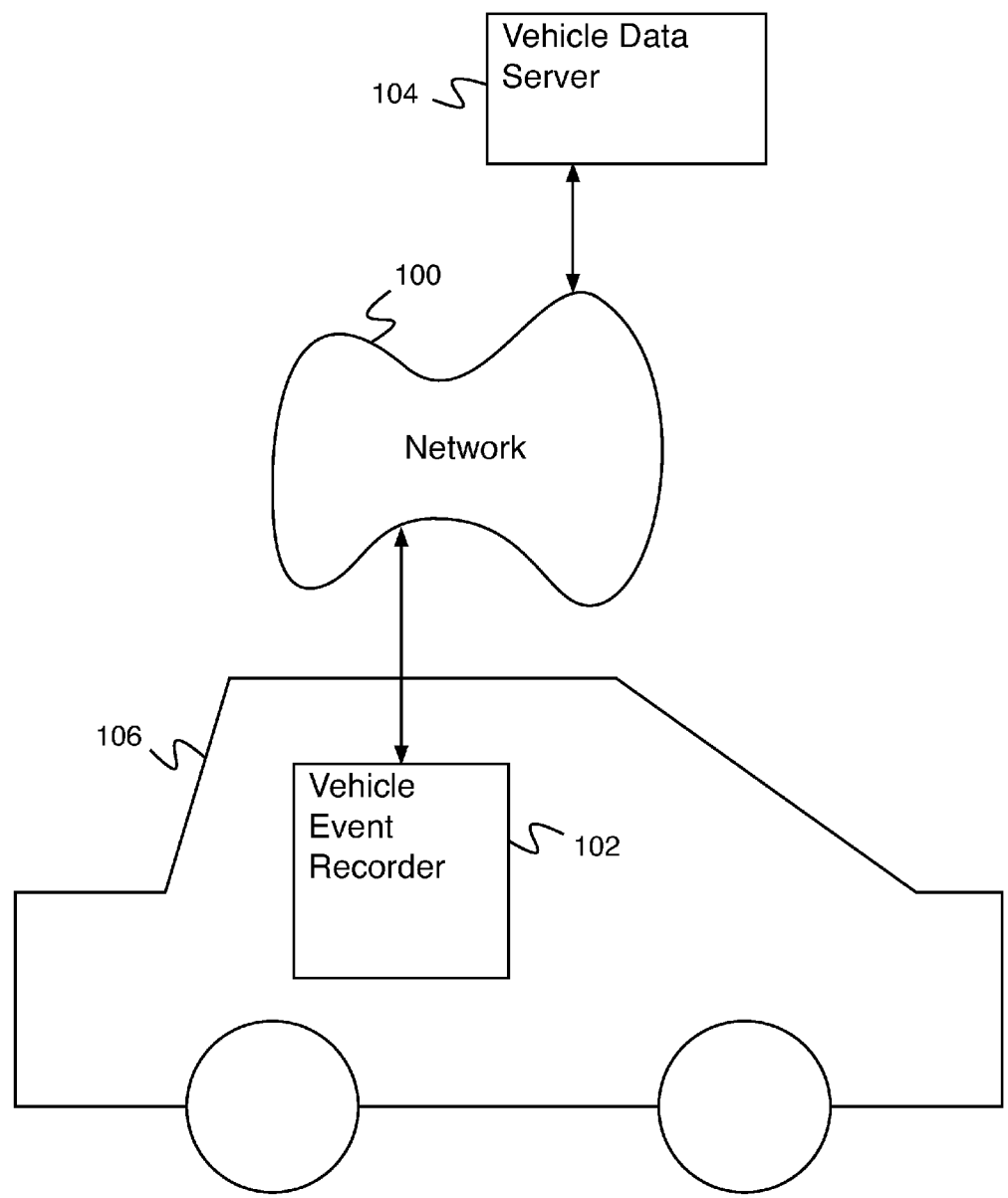
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Calibration of an advanced driver assistance system is disclosed. A system for calibrating comprises an input interface configured to receive an image data of a calibrator in front of a camera unit, and a calibration parameter determiner configured to determine a calibration parameter based at least in part on the image data, wherein the calibration parameter enables determination of an object proximity and a lane pattern, wherein the camera unit is mounted inside a vehicle, and wherein the calibrator is mounted outside the vehicle. The system for calibrating additionally comprises a memory coupled to the calibration parameter determiner and configured to provide the calibration parameter determiner with instructions.

In some embodiments, a vehicle event recorder performs a set of advanced driver assistance system functions (e.g., assisting with lane position, changing lanes, following distance, maintaining speed, etc.) in addition to the typical vehicle event recorder system functions (e.g., recording sensor data, recording video data, detection anomalous events, etc.). The vehicle event recorder comprises a set of sensors (e.g., audio and video recorders, global positioning system sensors, accelerometers, gyroscopes, etc.) for performing the advanced driver assistance functions and the vehicle event recorder system functions, and a device for recording the sensor data. In order for the advanced driver assistance system functions to operate properly, it must first be calibrated. The vehicle event recorder needs to determine calibration parameters describing the location of the bottom of the field of view (e.g., where the vehicle hood blocks the view of the road) and the lane position (e.g., how to determine lane position from the orientation of the lane stripes). This calibration step can be performed by driving the vehicle on an empty street or testing area, however, this can be logistically challenging, and it would be preferred to not require driving the vehicle in order to calibrate the advanced driver assistance system functions. A calibrator for an advanced driver assistance system that does not require driving the vehicle comprises an image (e.g., an image including road lane stripes) positioned in front of the camera unit of the vehicle event recorder. The calibrator is aligned in a predetermined position relative to the vehicle (e.g., relative to the vehicle windshield) and the advanced driver assistance system is calibrated using an image taken of the calibrator.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, cameras, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In some embodiments, vehicle event recorder 102 comprises an advanced driver assistance system (ADAS). In some embodiments, an ADAS comprises a system for determining whether vehicle 106 is drifting out of its lane, if vehicle 106 is following too close, for adaptively controlling the speed of vehicle 106, for automatically parking vehicle 106, or for any other appropriate purpose. In some embodiments, vehicle event recorder 102 comprises a system for calibrating an ADAS system (e.g., determining a top of a field of view, determining a bottom of a field of view, determining a horizon line, determining appropriate lane marker positions, or determining any other appropriate ADAS calibration information. In some embodiments, the calibration of ADAS system is achieved using a calibration parameter determiner. In some embodiments, the system for calibrating an ADAS system comprises one or more processors and associated memory for storing data and instructions. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location.

Figure 2:
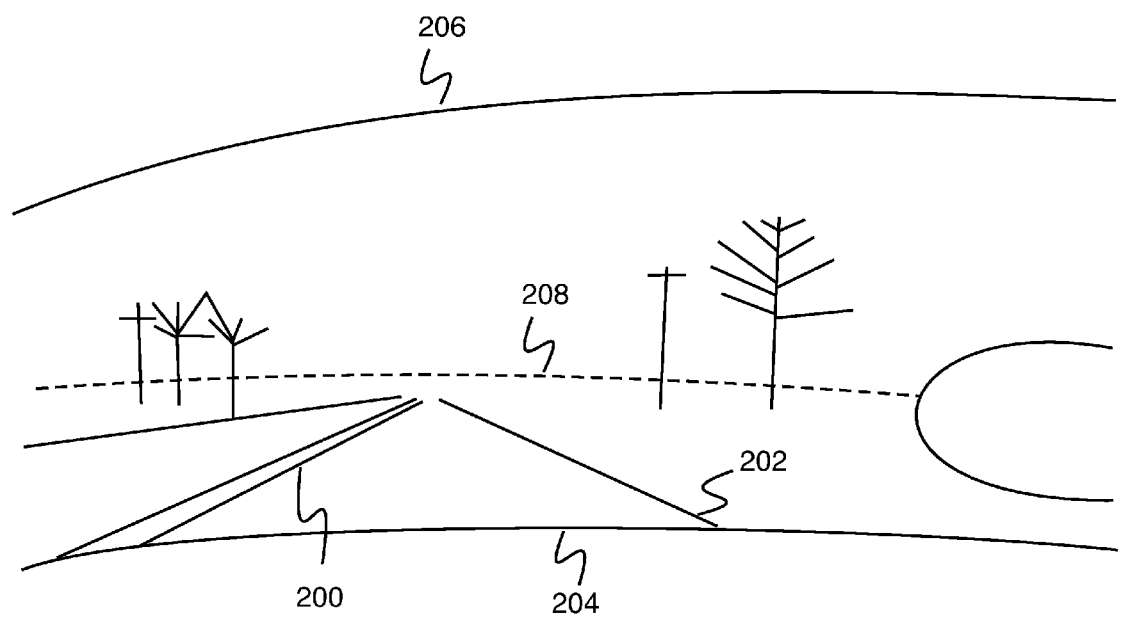
FIG. 2 is a diagram illustrating an embodiment of a camera view.

FIG. 2 is a diagram illustrating an embodiment of a camera view. In some embodiments, the camera view of FIG. 2 comprises a view from a camera included in a vehicle event recorder (e.g., vehicle event recorder 102 of FIG. 1). In some embodiments, the camera view of FIG. 2 is used for calibrating an ADAS system. In some embodiments, the camera view of FIG. 2 is taken when the vehicle is in a correct position on the road (e.g., positioned appropriately within its lane). In the example shown, the camera view of FIG. 2 includes road, ground, sky, trees, etc. In some embodiments, software (e.g., software running on vehicle event recorder 102 of FIG. 1) identifies the location of left side lane marker 200, right side lane marker 202, bottom of field of view line 204, top of field of view line 206, and horizon line 208 from the camera view. In some embodiments, identified locations are used to determine calibration parameters. In various embodiments, calibration parameters comprise, height of vehicle event recorder from the ground, offset from center of vehicle, width of vehicle, location of the Vehicle event recorder from the center of the windshield, and location of the vehicle event recorder from the top of the windshield, or any other appropriate calibration parameter.

Figure 3A:
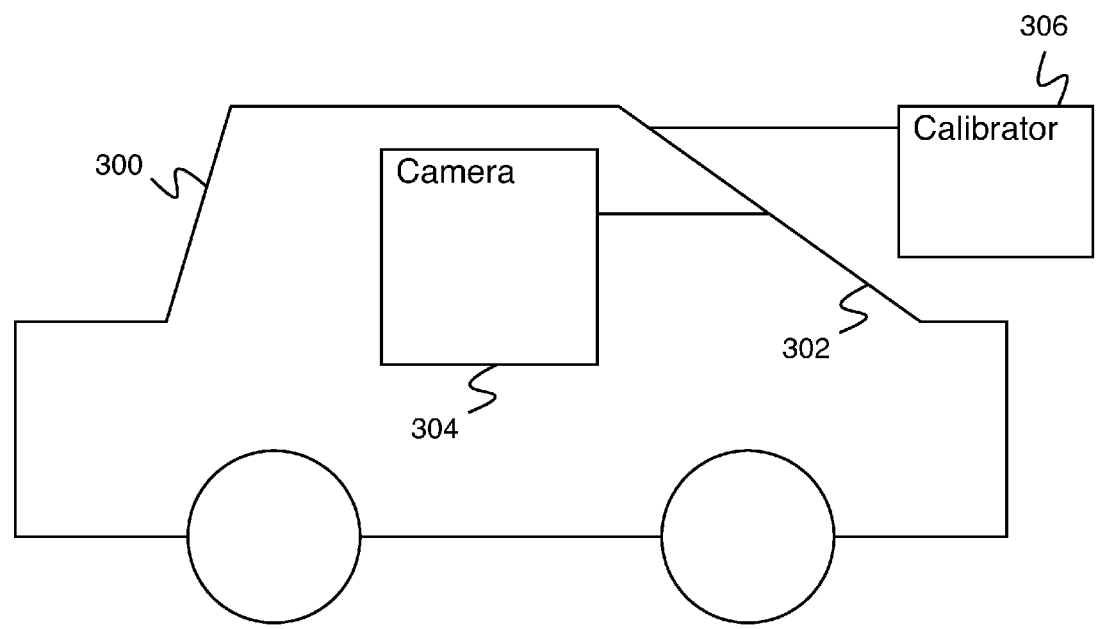
FIG. 3A is a diagram illustrating an embodiment of a calibration system including a camera and a calibrator.

FIG. 3A is a diagram illustrating an embodiment of a calibration system including a camera and a calibrator. In some embodiments, vehicle 300 comprises vehicle 106 of FIG. 1 including a calibrator. In the example shown, camera 304 is mounted to the inside of windshield 302 of vehicle 300 and calibrator 306 is mounted to the outside of windshield 302 of vehicle 300. In some embodiments, camera 304 is mounted on a vehicle front bumper. In some embodiments, camera 304 comprises part of a vehicle event recorder (e.g., vehicle event recorder 102 of FIG. 1). In some embodiments, calibrator 306 comprises a calibration image (e.g., an image simulating a camera view (e.g., the camera view of FIG. 2) for the purposes of calibrating). In some embodiments, calibrator 306 comprises a mount for mounting calibrator 306 to windshield 302. In some embodiments, the mount comprises alignment indicators for indicating when a calibration image is correctly aligned. In various embodiments, alignment indicators comprise a distance measure, a bubble level, a tilt sensor, or any other appropriate alignment indicators. In some embodiments, a calibration image of calibrator 306 comprises fiducial markers (e.g., markers for aligning the calibrator). In some embodiments, camera 304 comprises a light projector (e.g., a laser pointer, a laser line generator, a laser cross generator, an image projector, etc.) for projecting an image onto calibrator 306. In some embodiments, a fiducial marker on calibrator 306 is aligned to an image projected by a light projector of camera 304 in order to align calibrator 306 in a left-right or up-down direction (e.g., relative to a person sitting in the driver seat of vehicle 300). For example, the light projector projects a pattern of light that is lined up to fiducial marks on the calibrator in order to position or situate the calibrator in front of the camera (e.g., that has the light projectors attached) enabling an image to be taken of the calibrator by the camera that can be used to calibrate the systems (e.g., ADAS systems associated with the camera).

Figure 3B:
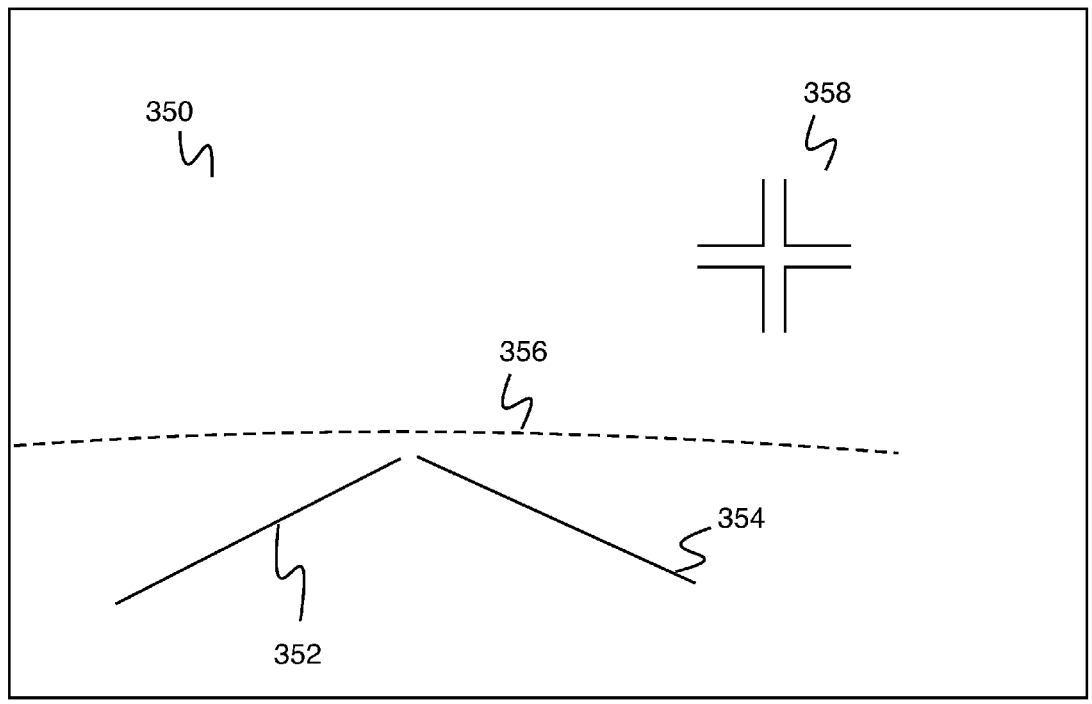
FIG. 3B is a diagram illustrating an embodiment of a calibration image.

FIG. 3B is a diagram illustrating an embodiment of a calibration image. In some embodiments, calibration image 350 comprises the calibration image of calibrator 306 of FIG. 3A. In the example shown, calibration image 350 comprises left side lane image 352 and right side lane image 354. In some embodiments, calibration image 350 comprises horizon line image 356. In some embodiments, calibration image 350 does not comprise a horizon line image, and calibration software determines a horizon line position based on the vanishing point of left side lane image 352 and right side lane image 354. Calibration image 350 additionally comprises fiducial 358. In some embodiments, fiducial 358 is used to align calibration image 350 to a fiducial (e.g., a fiducial projected by a fiducial projector mounted on a camera). In some embodiments, calibration image 350 comprises more than one fiducial.

Figure 4A:
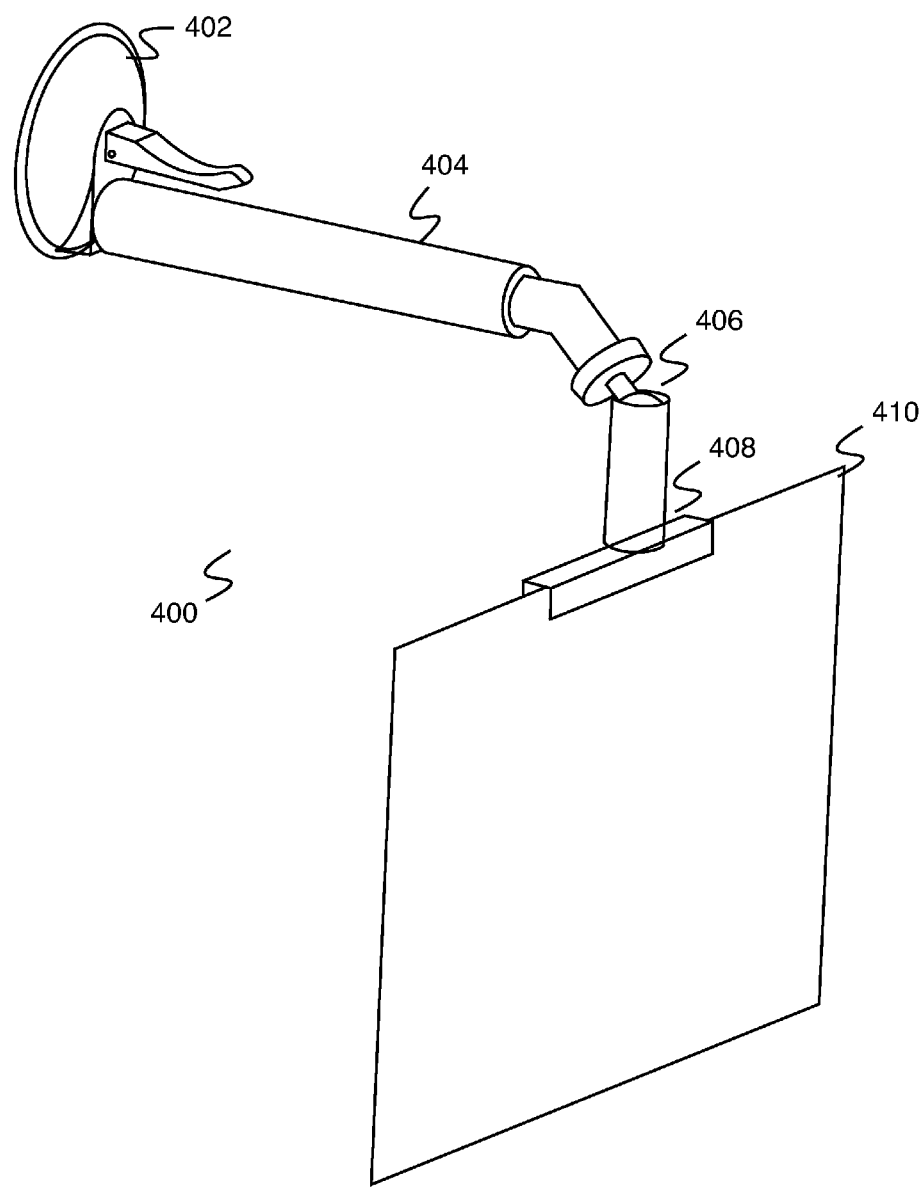
FIG. 4A is a diagram illustrating an embodiment of a calibrator.

FIG. 4A is a diagram illustrating an embodiment of a calibrator. In some embodiments, calibrator 400 comprises calibrator 306 of FIG. 3A. In the example shown, calibrator 400 comprises mount 402. In some embodiments, mount 402 comprises a suction cup. In some embodiments, mount 402 comprises an actuation lever (e.g., for pulling or releasing suction of the suction cup). In some embodiments, mount 402 comprises a mount for mounting calibrator 400 to a vehicle windshield. In some embodiments, mount 402 comprises an angle adjustor for adjusting the angle of mount 402 relative to shaft 404. In some embodiments, an angle adjustor is used to adjust the angle to compensate for the differing windshield angle of different vehicles. Shaft 404 comprises an extendable shaft for extending calibration image 410 away from the vehicle windshield. In some embodiments, shaft 404 comprises a telescoping shaft. In some embodiments, shaft 404 comprises a measurement indicator (e.g., indicating the distance from the vehicle windshield to calibration image 410). In some embodiments, shaft 404 comprises a correct location indicator (e.g., for indicating the when the telescoping shaft has been extended to the correct location—e.g., when calibration image 410 is the correct distance from the windshield). Calibrator 400 additionally comprises ball mount 406. Ball mount 406 allows calibration image 410 to be rotated around the z-axis (e.g., the vertical axis), the x-axis (e.g., the axis parallel to the driver's horizon line), and the y-axis (e.g., the axis extending forward from the vehicle). Calibrator 400 additionally comprises mount 408 for mounting calibration image 410. Calibration image 410 comprises a calibration image.

Figure 4B:
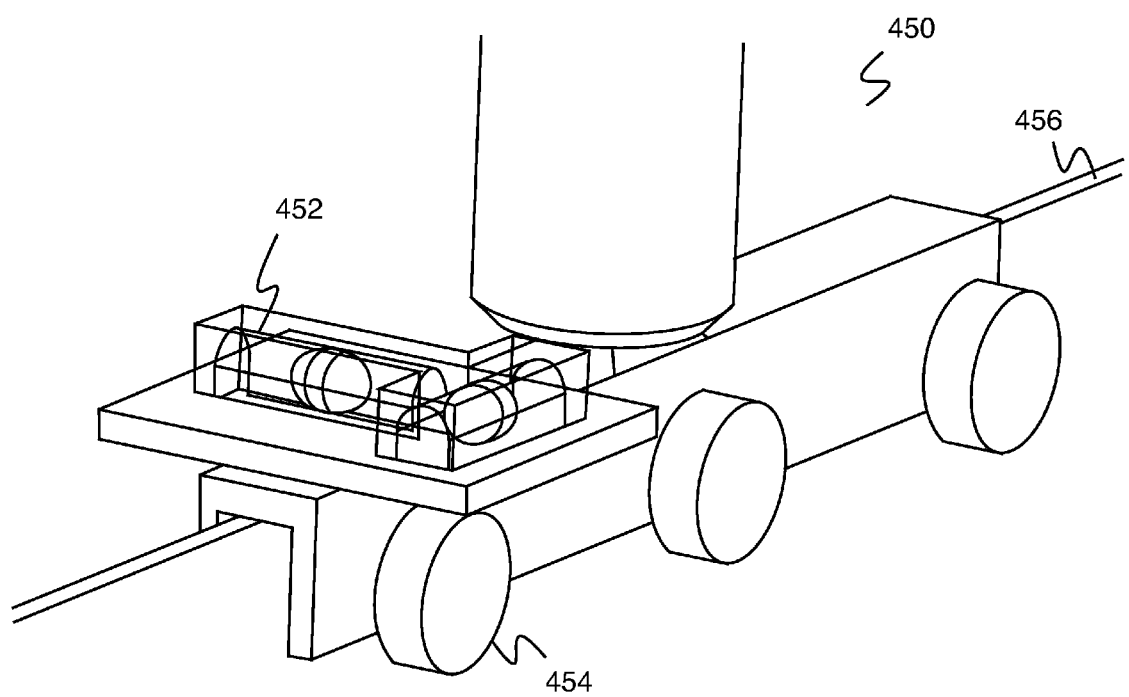
FIG. 4B is a diagram illustrating an embodiment of a mount.

FIG. 4B is a diagram illustrating an embodiment of a mount. In some embodiments, mount 450 comprises mount 408 of FIG. 4A. In the example shown, mount 450 comprises bubble level 452. Bubble level 452 comprises a bubble level for indicating if mount 450 is level. In the example shown, mount 450 comprises bubble levels for indicating if mount 450 is level to rotation on the x-axis and on the y-axis. Mount 450 additionally comprises fastener knobs (e.g., fastener knob 454) for fastening calibration image 456 to mount 450.

Figure 5:
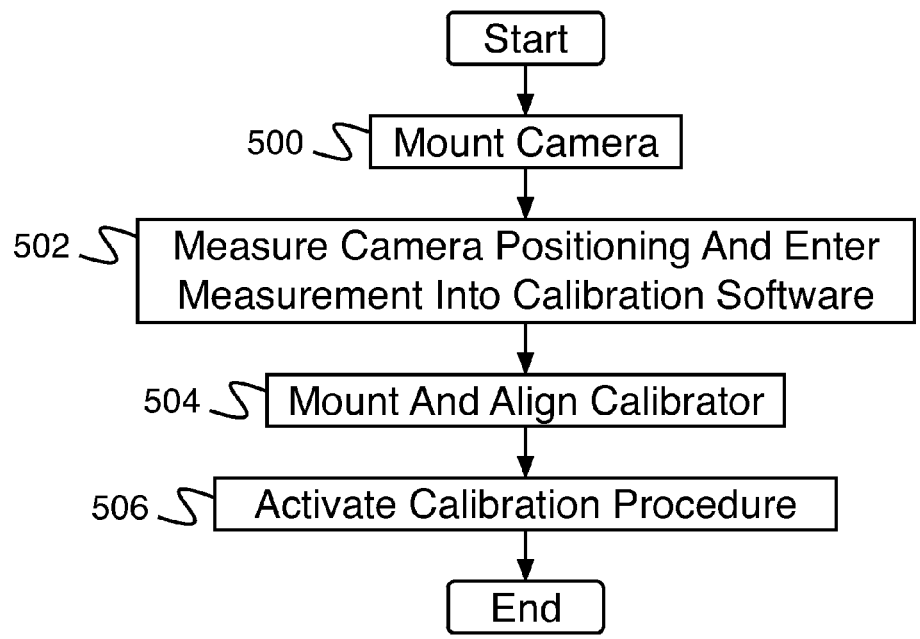
FIG. 5 is a flow diagram illustrating an embodiment of a process for using a calibration system.

FIG. 5 is a flow diagram illustrating an embodiment of a process for using a calibration system. In some embodiments, the process of FIG. 5 comprises a process for using the calibration system of FIG. 3A. In the example shown, in 500, a camera is mounted. In some embodiments, the camera comprises part of a vehicle event recorder. In some embodiments, the camera comprises a light projector (e.g., a light projector for projecting a fiducial for aligning a calibrator). In some embodiments, the camera is mounted to the inside of a windshield. In 502, the camera positioning is measured and the measurement is entered into calibration software. In some embodiments, calibration software comprises calibration software of a vehicle event recorder. In some embodiments, calibration software determines a calibration parameter based at least in part on camera positioning measurements. In various embodiments, camera positioning measurements comprise distance to the driver side door, distance to the passenger side door, distance to the floor, distance to the ceiling, horizontal measurements, vertical measurements, or any other appropriate camera positioning measurements. In 504, a calibrator is mounted and aligned. In some embodiments, the calibrator is mounted to the outside of a windshield. In some embodiments, a calibrator is mounted and aligned based at least in part on a fiducial projected by a light projector. In some embodiments, a fiducial projected by the light projector is projected through the windshield. In 506, a calibration procedure is activated. For example, the lane positions, horizon, and bottom and top view lines are used to determine a calibration of the ADAS system.

Figure 6:
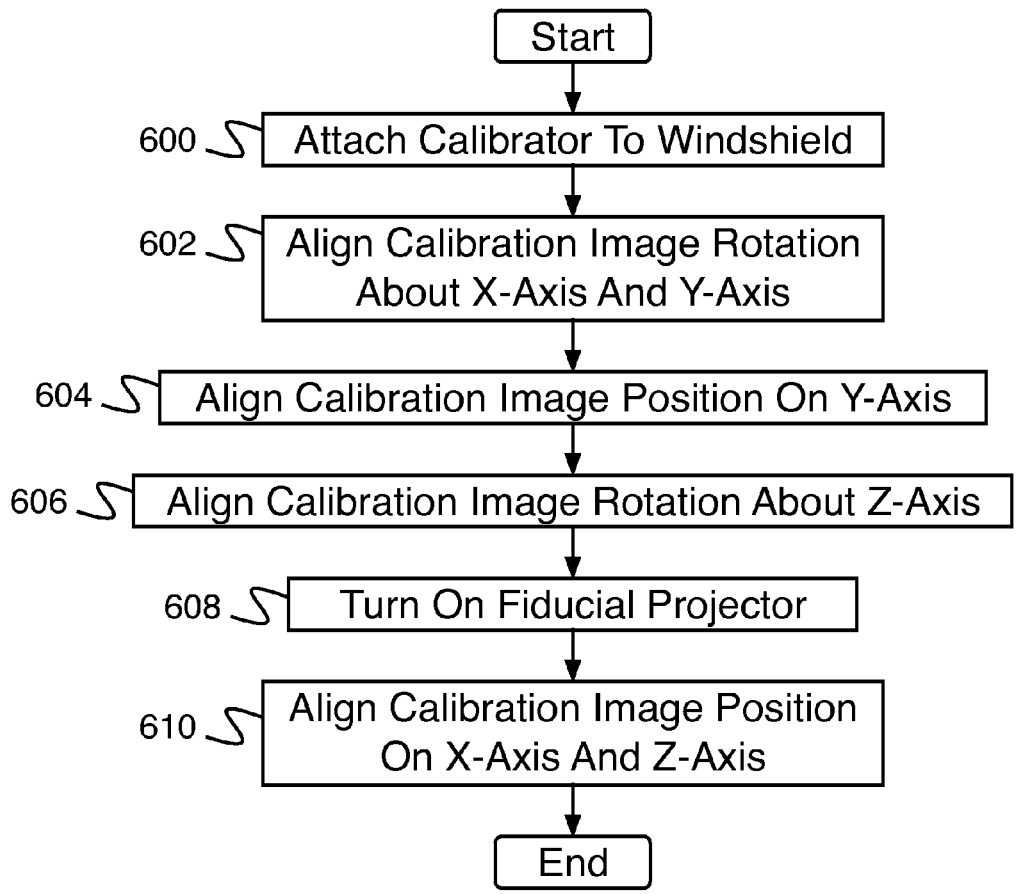
FIG. 6 is a flow diagram illustrating an embodiment of a process for mounting and aligning a calibrator.

FIG. 6 is a flow diagram illustrating an embodiment of a process for mounting and aligning a calibrator. In some embodiments, mounting and aligning a calibrator comprises situating a calibrator. In some embodiments, the process of FIG. 6 implements 504 of FIG. 5. In the example shown, in 600, the calibrator is attached to a windshield. In some embodiments, after the calibrator is attached to the windshield, an angle adjustor is used to level a shaft. In 602, a calibration image rotation about the x-axis and the y-axis is aligned. In some embodiments, the calibration image rotation about the x-axis and the y-axis is aligned using bubble levels. In 604, the calibration image position on the y-axis (e.g., the distance from the windshield) is aligned. In some embodiments, the calibration image position on the y-axis is aligned using a mark on a telescoping shaft. In some embodiments, the calibration image position on the y-axis is aligned using a measure (e.g., a tape measure). In 606, the calibration image rotation is aligned about the z-axis. In some embodiments, the calibration image rotation is aligned about the z-axis by adjusting the rotation about the z-axis until the distance from the windshield to the left side of the calibration image and from the windshield to the right side of the calibration image measure the same. In some embodiments, the distance from the windshield to the left side of the calibration image and from the windshield to the right side of the calibration image are measured using a measure (e.g., a tape measure). In 608, a fiducial projector is turned on. In 610, the calibration image position on the x-axis (e.g., in the left-right direction) and the z-axis (e.g., in the up-down direction) is aligned. In some embodiments, the calibration image position on the x-axis and the z-axis is aligned by moving the calibration image in the x-axis and the z-axis until a fiducial mark on the calibration image is aligned with a fiducial projected by the fiducial projector.

Figure 7:
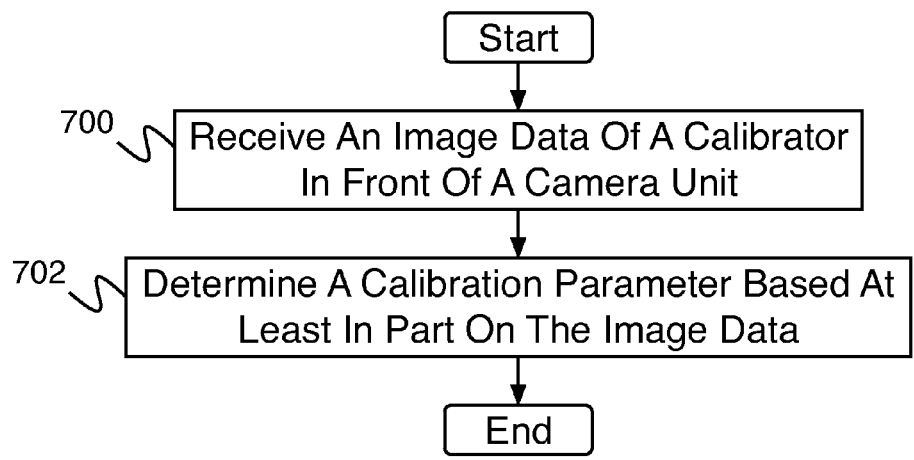
FIG. 7 is a flow diagram illustrating an embodiment of a process for calibrating.

FIG. 7 is a flow diagram illustrating an embodiment of a process for calibrating. In some embodiments, the process of FIG. 7 is used to calibrate an ADAS system of a vehicle event recorder (e.g., vehicle event recorder 102 of FIG. 1). In some embodiments, the calibration procedure of FIG. 7 comprises a calibration procedure activated in 506 of FIG. 5. In the example shown, in 700, an image data of calibrator in front of a camera unit is received. In 702, a calibration parameter is determined based at least in part on the image data. In some embodiments, the calibration parameter enables determination of an object proximity and a lane pattern. In some embodiments, the camera unit is mounted inside a vehicle. In some embodiments, the calibrator is mounted outside the vehicle. In some embodiments, a calibration parameter is based at least in part on camera positioning measurements (e.g., camera positioning measurements measured in 502 of FIG. 5).

Figure 8:
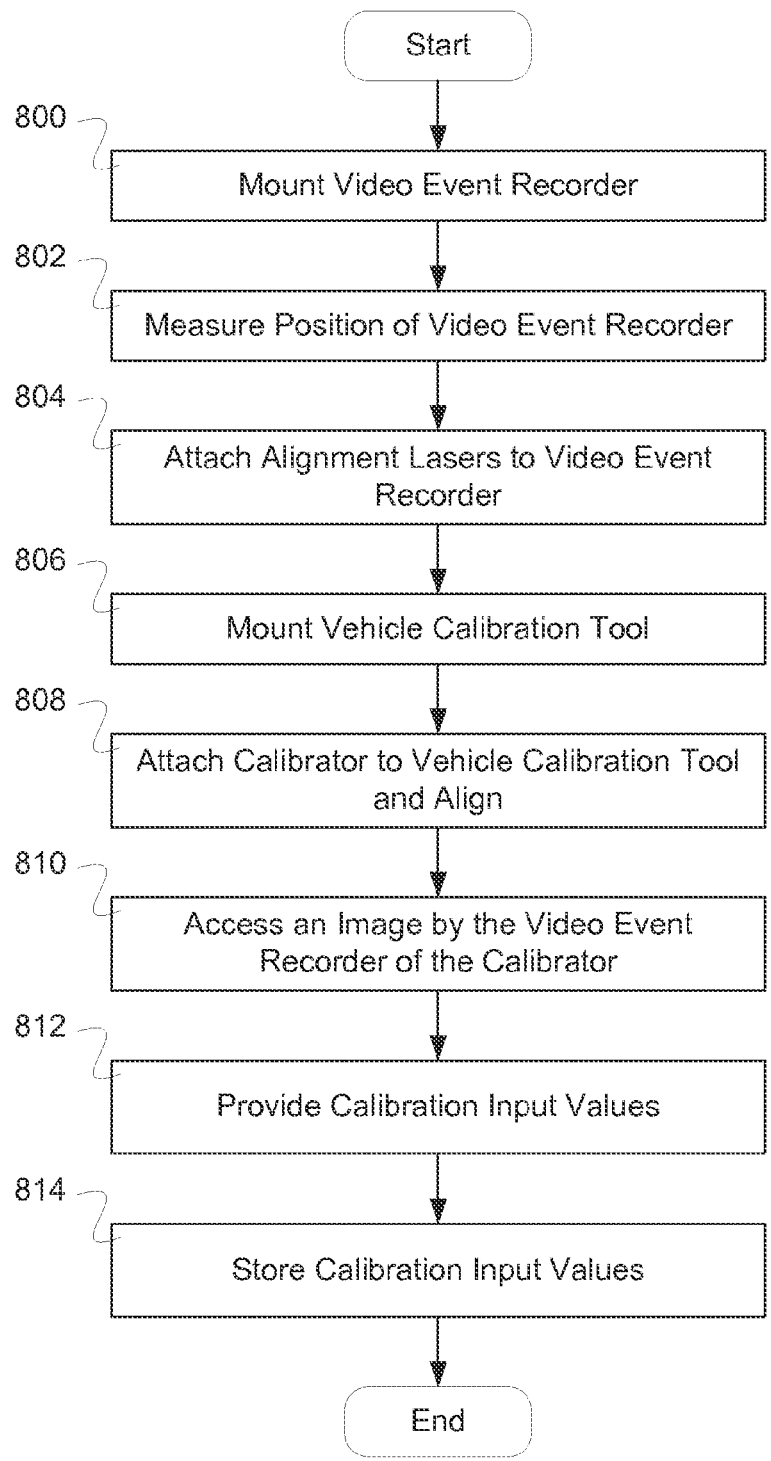
FIG. 8 is a flow diagram illustrating an embodiment of process for calibrating.

FIG. 8 is a flow diagram illustrating an embodiment of process for calibrating. In some embodiments, the process of FIG. 8 is used for calibrating an ADAS. In the example shown, in 800, a video event recorder is mounted. For example, the video event recorder is mounted to the windshield of a vehicle. In 802, a position of the video event recorder is measured. For example, the distance is measured from the ground to the center of the outward facing lens of the video event recorder (e.g., a distance is measured from the center of the lens to a floor board of a vehicle and from the floor board of the vehicle to the ground). For another example, the distance is measured from the center of the windshield to the center of the outward facing lens of the video event recorder (e.g., the distance left or right of center or up and down from center on the windshield using center etch lines on the window edge or by measuring to find the center of the edge of the window or distance to the top of the window). In 804, alignment lasers are attached to the video event recorder. For example, a cover is attached to the video event recorder that has attached alignment lasers. In some embodiments, the cover includes a tool that enables the video event recorder to be tilted forward (e.g., 5 degrees from horizontal). In 806, vehicle calibration tool is mounted. For example, the vehicle calibration tool is mounted to the outside of the windshield.

In 808, a calibrator is attached to the vehicle calibration tool and aligned. For example, the calibrator is placed in a ball mount and aligned using laser beams and fiducials on the calibrator as well as using bubble levels and measuring devices to make sure that the calibrator is flat to the windshield. In 810, an image by the video event recorder of the calibrator is accessed. For example, a user is able to access an image taken by the video event recorder via an interface to the video event recorder (e.g., a laptop communicating with the video event recorder via an universal serial bus (USB) port accesses an image). In 812, calibration input values are received. For example, measurement values are received (e.g., via a user interface). In various embodiments, measurement values include a position of the video event recorder, the distance from the ground to the center of the outward facing lens of the video event recorder, the distance from the center of the windshield to the center of the outward facing lens of the video event recorder, the position of the lane markers on the calibrator, the hood location, the horizon location, or any other appropriate calibration value. In various embodiments, the calibration measurement is input using a text field, a graphic overlay tool (e.g., cursor moved markers that enable overlaying calibrator markers for lane calibration), or any other appropriate input method. In 814, calibration input values are stored. For example, the values are stored in the vehicle event recorder and enable the ADAS system in the vehicle event recorder to determine lane position and to warn the driver in the event that the lane position of the vehicle is not correct.

In some embodiments, the calibration values enable the ADAS system to calibrate for the position of the vehicle event recorder and any orientation of the camera as it determines lane positions. In some embodiments, the calibrator and the calibration process enables a vehicle event recorder to be calibrated for its position and orientation as placed in a vehicle so that an ADAS system is able to be correctly function. In some embodiments, the calibrator and calibration process enables the calibration for ADAS without the need to drive the vehicle on a road, thus saving time and expense of an on road test for calibration.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for calibrating, comprising:
an input interface configured to receive an image data of a calibrator, wherein:
the image data is captured by a camera unit,
the camera unit is mounted inside a vehicle, and
the calibrator is mounted outside the vehicle, wherein the calibrator includes at least one lane marker image; and
a calibration parameter determiner configured to:
identify a characteristic of a lane and a characteristic of a field of view of the vehicle based on the image data while the vehicle is in a non-driving state; and
determine a calibration parameter based on the identified characteristics, wherein the calibration parameter improves accuracy of determination of an object proximity and a lane pattern compared with determination without the calibration parameter.

2. The system of claim 1, wherein the calibrator is situated in front of the camera unit and viewable by the camera unit through a windshield of the vehicle.

3. The system of claim 2, wherein the calibrator is situated using a laser fiducial.

4. The system of claim 3, wherein the laser fiducial is generated by a laser fiducial generator.

5. The system of claim 4, wherein the laser fiducial generator is coupled to the camera unit.

6. The system of claim 5, wherein the laser fiducial is projected through a windshield.

7. The system of claim 1, wherein the calibrator is provided on a windshield.

8. The system of claim 7, wherein the calibrator includes a mount to mount the calibrator to the windshield.

9. The system of claim 8, wherein the mount includes telescoping poles.

10. The system of claim 9, wherein the telescoping poles include length scales.

11. The system of claim 8, wherein the mount includes a suction cup.

12. The system of claim 8, wherein the mount includes a bubble level.

13. The system of claim 1, wherein the calibrator includes a fiducial.

14. A method for calibrating, comprising:
receiving an image data of a calibrator, wherein:
the image data is captured by a camera unit,
the camera unit is mounted inside a vehicle, and
the calibrator is mounted outside the vehicle, wherein the calibrator includes at least one lane marker image, and
identifying a characteristic of a lane and a characteristic of a field of view of the vehicle based on the image data while the vehicle is in a non-driving state; and
determining, using a processor, a calibration parameter based on the identified characteristics, wherein the calibration parameter improves accuracy of determination of an object proximity and a lane pattern compared with determination without the calibration parameter.

15. A computer program product for calibrating, the computer program product being embodied in a non-transitory computer readable storage medium and comprising computer instructions for:
receiving an image data of a calibrator, wherein the image data is captured by a camera unit is mounted inside a vehicle, and wherein the calibrator is mounted outside the vehicle and the calibrator includes at least one lane marker image;

identifying, using a processor, a characteristic of a lane and a characteristic of a field of view of the vehicle based on the image data while the vehicle is in a non-driving state; and determining, using the processor, a calibration parameter based on the identified characteristics, wherein the calibration parameter improves accuracy of determination of an object proximity and a lane pattern compared with determination without the calibration parameter.

16. A calibrator for calibrating a driver assistance system, comprising:

a mount; and an image coupled to the mount, wherein the mount mounts the image outside a vehicle and in front of a camera unit that is inside the vehicle, wherein the image includes a left side lane image and a right side lane image;

wherein the calibrating the driver assistance system is based on a calibration parameter, and the calibration parameter:

is determined, based on identifying a characteristic of a lane and a characteristic of a field of view of the vehicle based on the image, while the vehicle is in a non-driving state, and improves accuracy of determination of an object proximity and a lane pattern compared with determination without the calibration parameter.

17. The system of claim 1, wherein the received image data includes a graphic overlay for the field of view of the vehicle.

18. The system of claim 1, wherein the camera unit includes a projector to project a pattern of light onto the calibrator, the pattern of light guiding alignment of the calibrator with the camera unit.

19. The calibrator of claim 16, wherein the driver assistance system is further based on aligning the image with the camera unit, the aligning of the image with the camera unit indicating that the driver assistance system is calibrated for a position and an orientation of the driver assistance system as placed in the vehicle using an image taken of the calibrator by the camera unit.

20. The calibrator of claim 16, wherein the mount includes alignment indicators to show when the image is aligned with the camera unit and the aligning of the image is with an image taken of the calibrator by the camera unit.

* * * * *